Feb. 6, 1968  G. KRUSE  3,367,389
COMBINATION WINDOW, STORM WINDOW
Filed Jan. 25, 1966  2 Sheets-Sheet 1
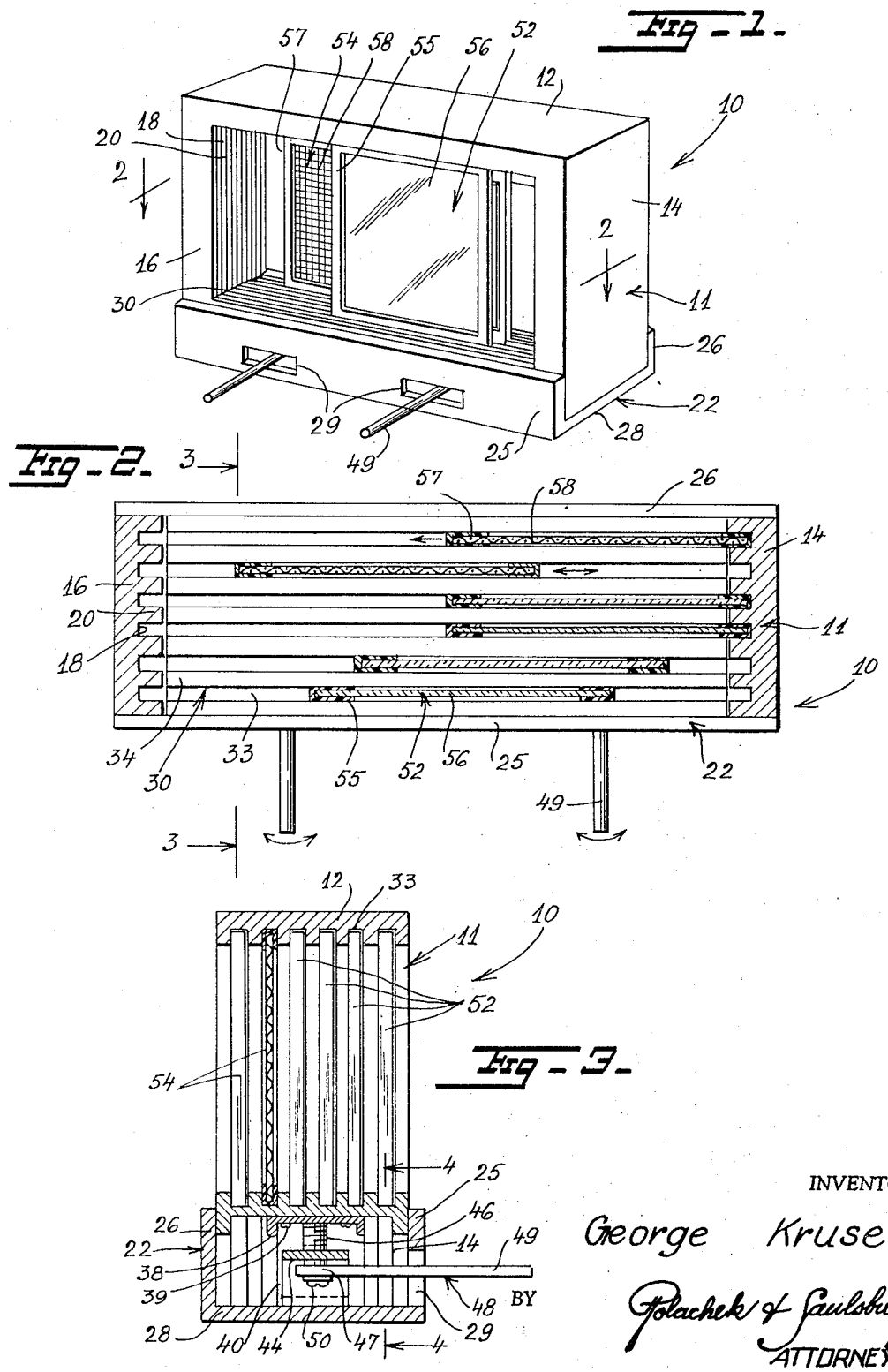
INVENTOR
George Kruse
BY Polachek & Saulsbury
ATTORNEYS

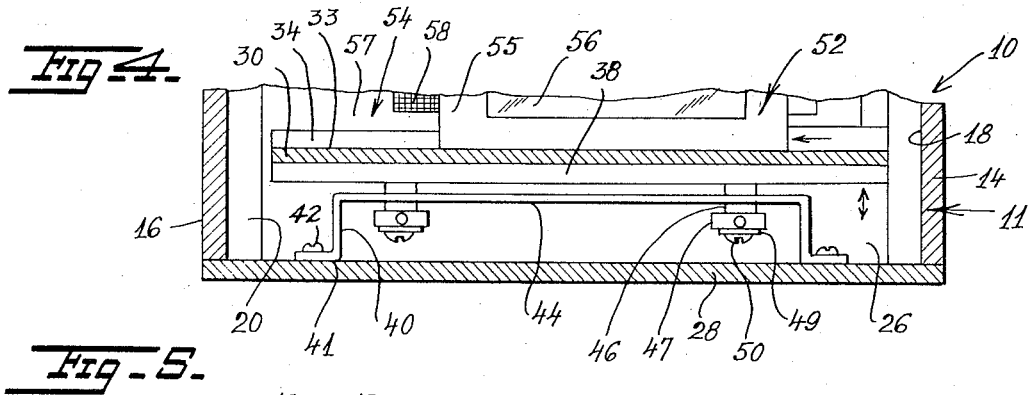
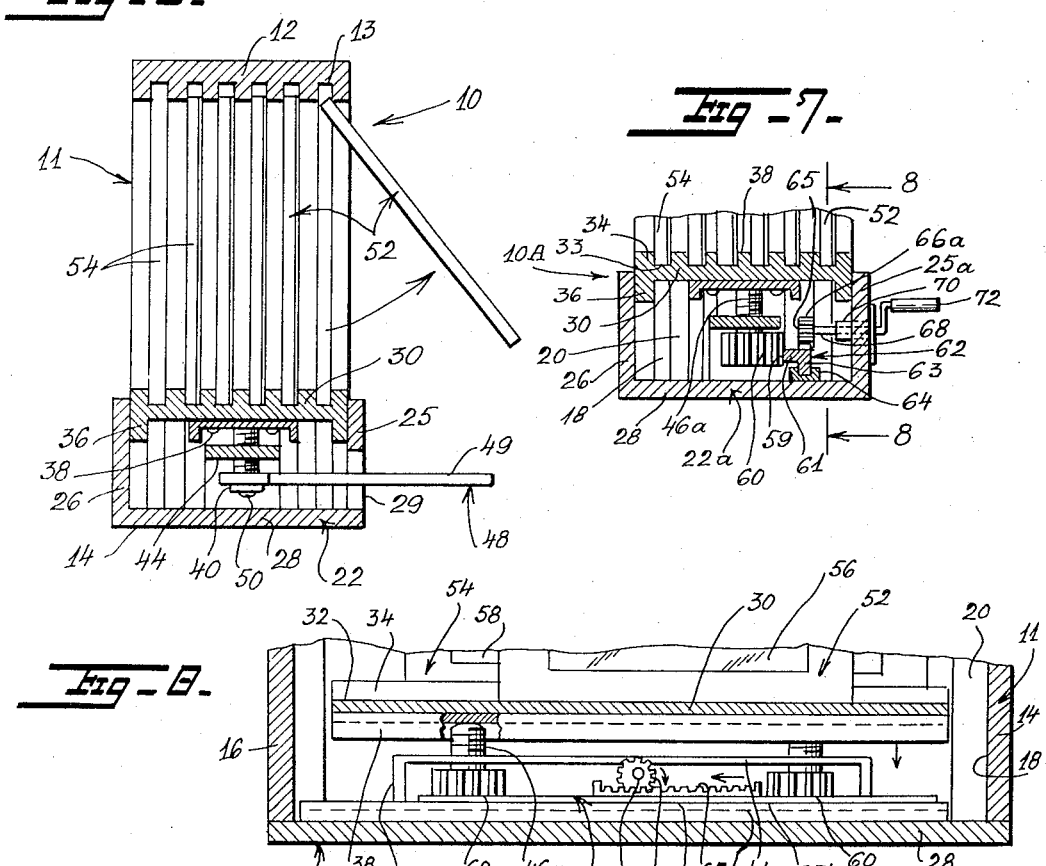
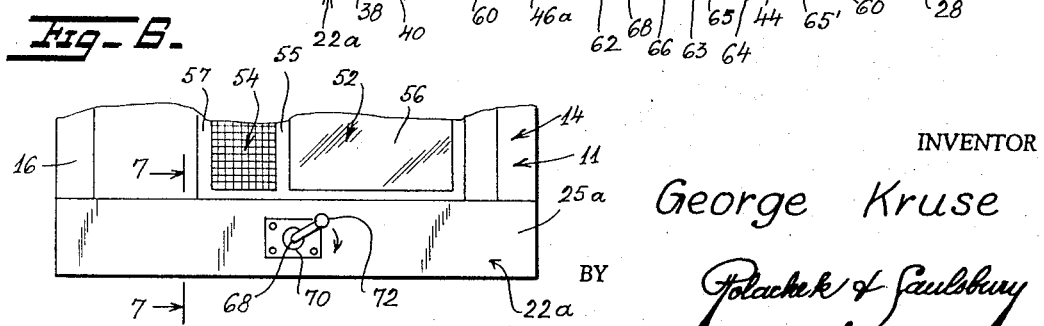

United States Patent Office 3,367,389
Patented Feb. 6, 1968

3,367,389
COMBINATION WINDOW, STORM WINDOW
George Kruse, 21 High St., Sayville, N.Y. 11106
Filed Jan. 25, 1966, Ser. No. 522,894
1 Claim. (Cl. 160—91)

ABSTRACT OF THE DISCLOSURE

A window frame assembly having multiple grooved top and end rails and a multiple groove horizontal runner vertically slidable and provided with grooves coplanar with the grooves in the rails for supporting panes of glass and screens. Means is provided for sliding the runner up and down in the frame.

*Brief summary of the invention*

A window frame assembly having a horizontal rail and two vertical rails depending from the ends of the horizontal rail. The rails have coplanar grooves for supporting panes of glass and screens. The frame has a channel-shaped base with windows therein. A platform plate slides in the base with windows therein. A platform plate slides in the base and in the grooves in the vertical rails, and manual means protrudes through the windows in the base for sliding said platform plate, carrying the panes of glass and screens.

This invention concerns a window assembly having six tracks for movably supporting two pairs of window panes and a pair of screens.

According to the invention there is provided a combination window, storm window and screen assembly which can be installed in window openings of homes, buildings, house trailers, and the like. The windows are made of panes of glass set in metal or plastic frames. The screens are wire or plastic mesh set in metal or plastic frames. Each window pane and screen moves horizontally in one of six parallel tracks provided in a large rectangular window frame having grooved top and end rails. In the window frame is a lower grooved platform or runner which can be raised or lowered by a manually operable mechanism. When the runner is raised, the window panes and screens are locked in place in tracks formed in the frame and runner. When the runner is lowered, the window panes and screens are disengaged from the frame to facilitate easy removal from and replacement in the window frame. The mechanism can be operated to lift the runner, window panes and screens adjustably so that the window panes and screens can slide horizontally easily. Further adjustment of the mechanism jams the window panes and screens in the window frame locking them in place.

It is therefore a principal object of the invention to provide a window assembly comprising a window frame having multiple grooved top and end rails, with a multiple grooved horizontal runner vertically slidable in the window frame.

A further object is to provide a window assembly as described with a plurality of window panes and screens carried by the runner, with a manually operable mechanism for the runner facilitating easy removal and replacement of the window panes and screens, and permitting the window panes and screens selectively and adjustably to be easily slidable in the window frame or to be locked immovably in the frame.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIGURE 1 is a perspective view of a window assembly embodying the invention.

FIG. 2 is an enlarged horizontal sectional view taken on line 2—2 of FIG. 1.

FIG. 3 is a vertical sectional view taken on line 3—3 of FIG. 2.

FIG. 4 is a fragmentary vertical sectional view taken on line 4—4 of FIG. 3.

FIG. 5 is a sectional view similar to FIG. 3, showing the runner in lowered position.

FIG. 6 is a fragmentary front elevational view of another window assembly embodying another form of the invention.

FIG. 7 is an enlarged fragmentary vertical cross sectional view taken on line 7—7 of FIG. 6.

FIG. 8 is a fragmentary longitudinal vertical sectional view taken on line 8—8 of FIG. 7.

Referring first to FIGS. 1–5, there is shown window assembly 10 comprising an inverted rectangular U-shaped frame structure 11 having a horizontal top rail 12 integrally joined at its ends by vertical end rails 14, 16. Six parallel grooves 18 are formed in the inner sides of the rails spaced apart by ridges 20. The bottom ends of rails 14, 16 seat snugly in a rectangular, shallow U-shaped frame base 22. Base 22 has front and rear vertical walls, 25, 26 joined by a flat horizontal bottom wall 28. Two spaced apart rectangular openings 29 are provided in front wall 25. Each opening is located about one quarter of the length of base 22 from each end of the wall 25. Slidably mounted in the base is a platform or runner 30. This runner is a horizontal platform plate formed with parallel grooves 33 in its upper side defined by spaced parallel ridges 34. The grooves 33 are coplanar with grooves 18 respectively. Lateral depending flanges 36 are provided at opposite edges of the runner. The runner 30 is vertically slidable up and down in base 22 with flanges 36 contacting the inner opposing sides of walls 25, 26 of the base 22.

Runner 30 is supported by a plate 38 secured by screws 39 to the underside of the runner. A bracket 40 is mounted on the bottom wall 28 of the base. This bracket is an inverted U-shaped structure with horizontal flanges 41 secured by screws 42 to wall 28. Two threaded holes are provided in rail 44. These holes are spaced apart and receive two axially vertical bolts 46. The runner 30 rests on free upper ends of the bolts 46. To the lower ends of the bolts underneath the rail 44 are secured the heads 47 of two ratchet wrenches 48. Handles 49 of the wrenches extend horizontally outwardly of wall openings 29. Screws 50 are used to secure the heads of the ratchet wrenches 48 to the bottom ends of the bolts 46.

The window assembly is provided with four window panes 52 and two window screens 54 disposed vertically in adjacent grooves 33 of the runner. Each window pane 52 includes a rectangular frame 55 made of metal or plastic material in which is secured a rectangular glass panel 56. Each window screen 54 includes a rectangular frame 57 made of metal or plastic material in which is secured a metal or plastic mesh screen 58. The window panes and screens slide horizontally freely engaged between grooves 18 in top rail 12 and grooves 33 in runner 30. The ratchet wrenches can be manually operated to turn the bolts 46, so that the window panes and screens are loosely held to permit free horizontal movement. The wrenches can be operated to turn the bolts and raise the runner until the window panes and screens are jammed up against rail 12. This will lock the window panes and screens in place in the window frame structure. The runner 30 can be lowered a fraction of an inch to the position shown in FIG. 5 so that any one or all window panes and screens can be lifted up off the runner and out of the window frame assembly. Replacement of a removed window pane or screen is done by reverse movements. Again the runner can be raised by operating the wrenches to lock the window panes and frame screens in any desired position in the window frame structure.

FIGS. 6-8 show another window assembly 10A which is generally similar to window assembly 10 and corresponding parts are identically numbered. In window assembly 10A, the elevating mechanism for runner 30 employs a gear train including spur gears 60 secured to lower ends of bolts 46a which are carried by bracket 40. The gears 60 are axially vertical and are engaged with teeth 59 formed on one flange 61 of a horizontal rack gear 62 which is generally L-shaped in cross section. The rack gear has a vertical flange 63 which fits slidably in a channel shaped guide rail 64 secured to the bottom wall 28 of base 22a. A horizontal row or array of teeth 65 are formed on the rack gear at the intersection of flanges 61 and 63. Teeth 65 extend upwardly and are engaged with a spur gear 66 secured to the inner end of crank shaft 68 rotatably mounted in a bearing 70 secured to the vertical front wall 25a of base 22a. A handle 72 is provided on the outer end of the crankshaft. Long teeth 65' serve as stop elements at opposite ends of the array of teeth 65.

When the handle 72 is turned in one direction or another, the gear 66 drives the rack gear horizontally and turns both gears 60 simultaneously. Thus the bolts 46a are turned simultaneously and the runner 30 is raised or lowered depending on the direction in which handle 72 is turned. The gears 60 remain in engagement with teeth 59 at all times. The frictional engagement of the parts of the gear train prevents turning of the bolts 46a by the weight of the window panes, screens and runner alone. Only when the handle 72 is turned can the rack gear slide longitudinally in rail 64 for turning gears 60. Thus gears 60 slide axially with respect to rack gear 62 while being rotated by the rack gear.

The window assembly 10A operates like assembly 10 in that a manually operable mechanism is used to lower and raise the window panes and screens. Thus the window panes and screens can be adjustably positioned for easy sliding, removal and replacement, and can be locked in position by fully elevating the runner. The window panes and screens can be engaged at the grooves 18 at either of the vertical end rails 14, 16 when the window panes and screens are locked in position.

There has thus been provided a window assembly which can be installed as an operative unit in a window opening in a house, building, house trailer or other installation where a multiple component window assembly will be useful. The window panes and screens will in general have a width of about one half the horizontal length of the rectangular opening defined by the window frame structure. This permits all the window panes and screens to be moved laterally to provide a clear space through the assembly.

The components of the window frame structure can be made of extruded metal or plastic parts at low cost. The window assembly is easy to install and simple to use.

While I have illustrated and described the preferred embodiments of my invention, it is to be understood that I do not limit myself to the precise construction herein disclosed and that various changes and modifications may be made within the scope of the invention as defined in the appended claim.

What is claimed is:

1. A window frame assembly, comprising an inverted rectangular U-shaped frame structure having a horizontal rail and two vertical rails joined at upper ends thereof to opposite ends of the horizontal rail, said rails having a plurality of parallel alternating ridges and grooves extending longitudinally on inner sides thereof for receiving rectangular window panes and screens, a channel-shaped horizontal base receiving and supporting bottom ends of the vertical rails to define a rectangular frame structure with rectangular window openings, said base having a horizontal bottom wall joined to opposing vertical front and rear walls, a horizontal platform plate vertically movable between the front and rear walls of the base, said platform plate having other parallel grooves formed in its upper side, said other grooves being coplanar with the respective grooves in the rails for supporting said window panes and screens in vertical positions, and a manually operable mechanism for adjustably lowering and raising said platform plate for releasing the window panes and screens from the top rail and for locking the window panes and screens between the top rail and said platform plate, said manually operable mechanism comprising a bracket mounted on the bottom wall of the base, said bracket having spaced holes, a pair of axially vertical, horizontally spaced bolts threaded in the holes in the bracket, said bolts having free upper ends supporting said platform plate, means fixed on the bolts for turning the bolts to raise and lower the platform plate, said latter means comprising spur gears engaged on lower ends of the bolts, a horizontal slidable rack gear having a first horizontal array of teeth engaged with the spur gears to turn both gears simultaneously, a stationary guide rail on the bottom wall of the base slidably supporting said rack gear, said rack gear having another horizontal array of teeth, a crank shaft rotatably supported by the front wall of the base, another spur gear supported by the crank shaft and rotatable thereby, said other spur gear being engaged with said other array of teeth to move the rack gear horizontally, and a handle on the crank shaft outside of the front wall of the base for turning the crank shaft, whereby the platform plate is adjustably raised and lowered while the spur gears on the bolts remain in engagement with the first array of teeth of the rack gear.

References Cited

UNITED STATES PATENTS

| | | | |
|---|---|---|---|
| 755,232 | 3/1904 | Leonard | 49—174 |
| 816,862 | 4/1906 | Kirk | 49—174 |
| 857,826 | 6/1907 | Oliver | 49—174 |
| 950,765 | 3/1910 | Fischer | 49—452 |
| 1,104,940 | 7/1914 | Sire | 49—452 |
| 2,032,170 | 2/1936 | Fisk | 160—90 X |
| 2,782,466 | 2/1957 | Rylander | 160—90 X |
| 2,869,187 | 1/1959 | Liebman et al. | 160—90 X |

DAVID J. WILLIAMOWSKY, *Primary Examiner.*

PETER M. CAUN, *Examiner.*